(12) United States Patent
Yoshida et al.

(10) Patent No.: US 12,045,748 B2
(45) Date of Patent: Jul. 23, 2024

(54) MANAGEMENT METHOD AND SERVER APPARATUS

(71) Applicant: HONDA MOTOR CO., LTD., Tokyo (JP)

(72) Inventors: Junjiro Yoshida, Tokyo (JP); Hibiki Koga, Wako (JP); Yoshihiro Takahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 126 days.

(21) Appl. No.: 17/350,096

(22) Filed: Jun. 17, 2021

(65) Prior Publication Data
US 2021/0312374 A1    Oct. 7, 2021

Related U.S. Application Data

(63) Continuation of application No. PCT/JP2018/048169, filed on Dec. 27, 2018.

(51) Int. Cl.
G06Q 10/0631    (2023.01)
G06Q 10/0635    (2023.01)

(52) U.S. Cl.
CPC ........... *G06Q 10/063114* (2013.01); *G06Q 10/063118* (2013.01); *G06Q 10/06313* (2013.01); *G06Q 10/0635* (2013.01)

(58) Field of Classification Search
None
See application file for complete search history.

(56) References Cited

U.S. PATENT DOCUMENTS

| 10,231,084 B2* | 3/2019 | Bagchi | H04W 4/40 |
| 10,467,565 B2 | 11/2019 | Lareau et al. | |
| 2007/0043811 A1* | 2/2007 | Kim | G06Q 50/16 |
| | | | 709/203 |
| 2008/0047224 A1* | 2/2008 | Lam | E04H 5/02 |
| | | | 52/741.1 |

(Continued)

FOREIGN PATENT DOCUMENTS

| JP | H09-037632 A | 2/1997 |
| JP | 2004-169355 A | 6/2004 |

(Continued)

OTHER PUBLICATIONS

International Search Report for PCT/JP2018/048169 mailed Mar. 12, 2019.

(Continued)

*Primary Examiner* — Folashade Anderson
(74) *Attorney, Agent, or Firm* — Thomas| Horstemeyer, LLP

(57) ABSTRACT

The present invention provides a management method that manages a plurality of worksites, comprising: acknowledging a work status of each worksite per work type based on information obtained from a plurality of types of work machines at each worksite; comparing the work status with a plan, and managing a progress status of each worksite per work type; specifying, based on the progress status, a work type of a worksite for which the work status has been delayed relative to the plan; and making, with regard to a work machine and a worker for the work type with the delay, a request for dispatch to the worksite with the delay to another worksite.

9 Claims, 6 Drawing Sheets

(56) References Cited

U.S. PATENT DOCUMENTS

| | | | |
|---|---|---|---|
| 2008/0103868 A1* | 5/2008 | Santos | G06Q 10/06398 705/7.17 |
| 2014/0032255 A1* | 1/2014 | Hegazi | G06Q 10/06312 705/7.22 |
| 2014/0330605 A1* | 11/2014 | Connolly | G06Q 10/063116 705/7.16 |
| 2016/0291590 A1 | 10/2016 | Kuniyasu et al. | |
| 2017/0278041 A1* | 9/2017 | LaReau | G06Q 10/063114 |
| 2017/0349058 A1 | 12/2017 | Bernier et al. | |
| 2018/0113444 A1* | 4/2018 | Harada | G05B 19/41865 |
| 2020/0210965 A1* | 7/2020 | Garber | G06N 5/04 |
| 2020/0363183 A1* | 11/2020 | Shimamura | G06M 11/00 |
| 2022/0129000 A1* | 4/2022 | Ingvalson | G05D 1/0274 |

FOREIGN PATENT DOCUMENTS

| | | | |
|---|---|---|---|
| JP | 2015-049871 A | | 3/2015 |
| WO | 2017/130446 A1 | | 8/2017 |
| WO | 2018/146518 A1 | | 8/2018 |
| WO | 2020/136813 A1 | | 7/2020 |

OTHER PUBLICATIONS

Supplemental European Search Report for European Patent Application No. 18944975.4 mailed Oct. 6, 2021.

\* cited by examiner

FIG. 6

| | EVALUATION VALUE | | | | |
|---|---|---|---|---|---|
| | ≤ THRESHOLD A | ≤ THRESHOLD B | ≤ THRESHOLD C | ≤ THRESHOLD D | > THRESHOLD D |
| DIFFERENCE BETWEEN ROUTE OF MOVEMENT AND REFERENCE ROUTE | +3 | +2 | +1 | ±0 | −1 |
| DIFFERENCE BETWEEN SPEED OF MOVEMENT AND REFERENCE SPEED | +2 | +1 | ±0 | −1 | −2 |

US 12,045,748 B2

MANAGEMENT METHOD AND SERVER APPARATUS

CROSS-REFERENCE TO RELATED APPLICATION(S)

This application is a continuation of International Patent Application No. PCT/JP2018/048169 filed on Dec. 27, 2018, the entire disclosures of which are incorporated herein by reference.

BACKGROUND OF THE INVENTION

Field of the Invention

The present invention relates to a technique to manage a plurality of worksites.

Background Art

PTL 1 discloses a method of managing the progress status of work at a lawn mowing site. Specifically, it discloses a method in which position information of a lawn mower at a lawn mowing site is displayed on a display, and an administrator of a central control center manages work (issues instructions to the lawn mower) while viewing the position, the moving direction, and the like of the lawn mower on the display.

There are cases where work that uses a plurality of types of work machines is performed at a plurality of worksites in parallel. In these cases, if a work plan is delayed or advanced per work type at each worksite, the overall work efficiency of the plurality of worksites could possibly decrease.

In view of this, the present invention aims to improve the overall work efficiency of a plurality of worksites.

CITATION LIST

Patent Literature

PTL 1: Japanese Patent Laid-Open No. 9-37632

SUMMARY OF THE INVENTION

According to the present invention, there is provided a management method that manages a plurality of worksites, comprising: acknowledging a work status of each worksite per work type based on information obtained from a plurality of types of work machines at each worksite; comparing the work status with a plan, and managing a progress status of each worksite per work type; specifying, based on the progress status, a work type of a worksite for which the work status has been delayed relative to the plan; and making, with regard to a work machine and a worker for the work type with the delay, a request for dispatch to the worksite with the delay to another worksite.

Further features of the present invention will become apparent from the following description of exemplary embodiments with reference to the attached drawings.

BRIEF DESCRIPTION OF THE DRAWINGS

FIG. 6 is one example of a table showing the relationships of evaluation values to the differences between detected values and reference values.

DESCRIPTION OF EMBODIMENTS

The following describes embodiments of the present invention with reference to the attached drawings. Note that each drawing is a schematic diagram showing a structure or a configuration of an embodiment, and the dimensions of each member illustrated do not necessarily reflect the actual dimensions. Furthermore, the same reference sign denotes the same elements in respective drawings, and explanations of duplicate contents are omitted in the present specification.

First Embodiment

Figure 1A:
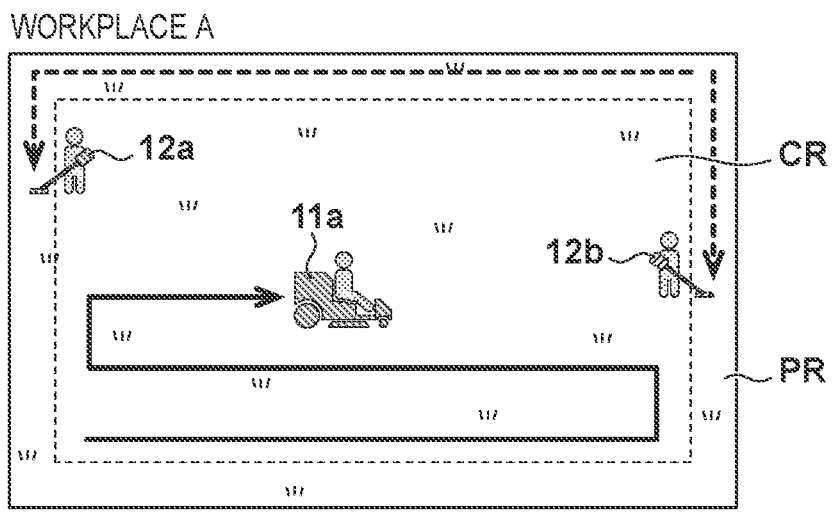
FIG. 1A is a diagram showing a state where work is performed using a plurality of types of work machines at a workplace A.
Figure 1B:
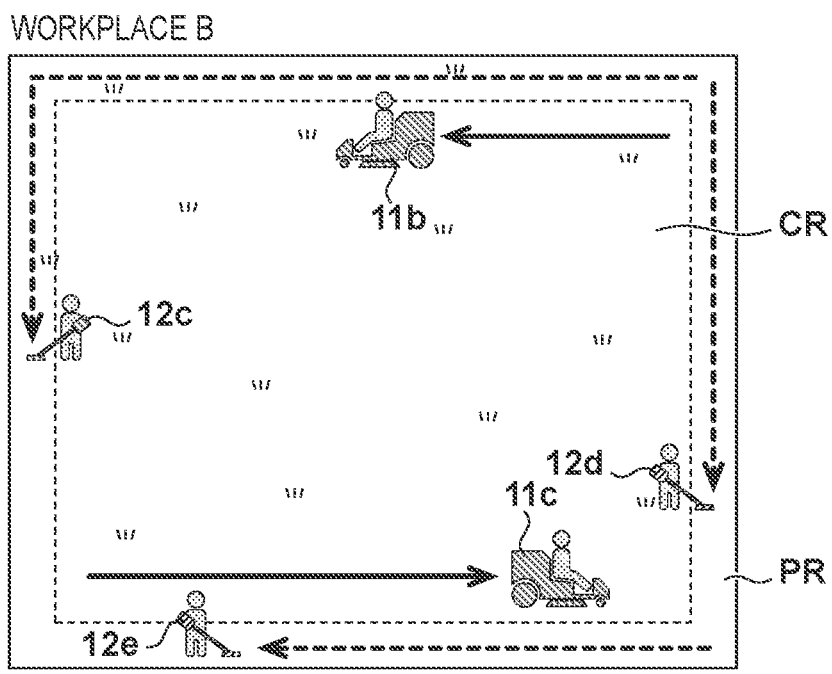
FIG. 1B is a diagram showing a state where work is performed using a plurality of types of work machines at a workplace B.
Figure 1C:
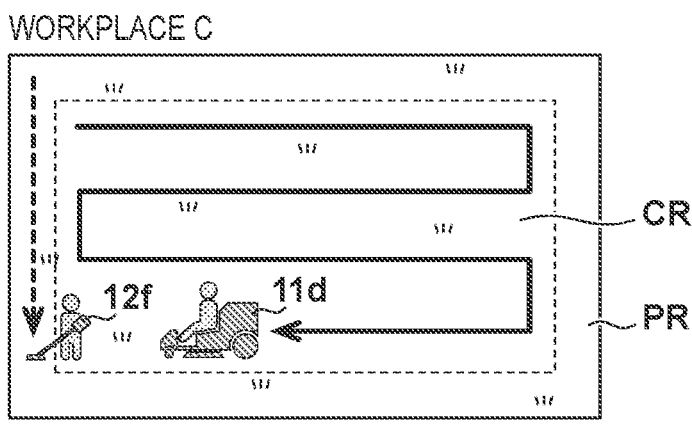
FIG. 1C is a diagram showing a state where work is performed using a plurality of types of work machines at a workplace C.

A description is now given of a first embodiment according to the present invention. FIGS. 1A to 1C are diagrams showing a state where work is performed using a plurality of types of work machines at each of a plurality of workplaces. The present embodiment will be described using an example in which lawn mowing work is performed at worksites A to C, which are distanced from one another, with use of ride-on lawn mowers (first lawn mowers 11) and walk-type lawn mowers (second lawn mowers 12) as the plurality of types of work machines. The ride-on first lawn mowers 11 are used in lawn mowing work in a central region CR (a region inside a dash line) of each of the worksites A to C, whereas the walk-type second lawn mowers 12 are used in lawn mowing work in a peripheral region PR (a region outside the dash line (central region)) of each of the worksites A to C, in which it is difficult to perform work with use of the first lawn mowers 11. Here, work that uses the plurality of types of work machines is not limited to lawn mowing work, and may be, for example, agricultural work, snow plowing work, and so forth, in which case the plurality of work machines are not limited to lawn mowers and, for example, blowers, cultivators, snowplows, and so forth can be used thereas.

In the case of the present embodiment, at the worksite A, lawn mowing work is performed using one first lawn mower 11a and two second lawn mowers 12a and 12b as shown in FIG. 1A, whereas at the worksite B, lawn mowing work is performed using two first lawn mowers 11b and 11c and three second lawn mowers 12c, 12d and 12e as shown in FIG. 1B. Furthermore, at the worksite C, lawn mowing work is performed using one first lawn mower 11d and one second lawn mower 12f as shown in FIG. 1C. Lawn mowing work is performed at the worksites A to C in parallel, and the number of first lawn mowers 11 and the number of second lawn mowers 12 to be used in each of the worksites A to C can be decided on from past performances, such as the sizes of the worksites, the capability of each work machine, and the capability of each worker.

In a case where lawn mowing work is performed at the plurality of worksites A to C in parallel in the foregoing manner, if a work plan is delayed or advanced per work type at each worksite, the overall work efficiency of the plurality of worksites A to C decreases. Therefore, in the present embodiment, the work status of each of the worksites A to C is acknowledged per work type, and a request for dispatch to a worksite with this delay is made to another worksite based on a work machine and a worker for a work type for which the work status has been delayed relative to the work plan. A work type denotes a type of work that is in execution at one worksite; in the present embodiment, work types include lawn mowing work in the central region CR that uses first lawn mowers 11, and lawn mowing work in the peripheral region PR that uses second lawn mowers 12.

[About System Configuration]

Figure 2:
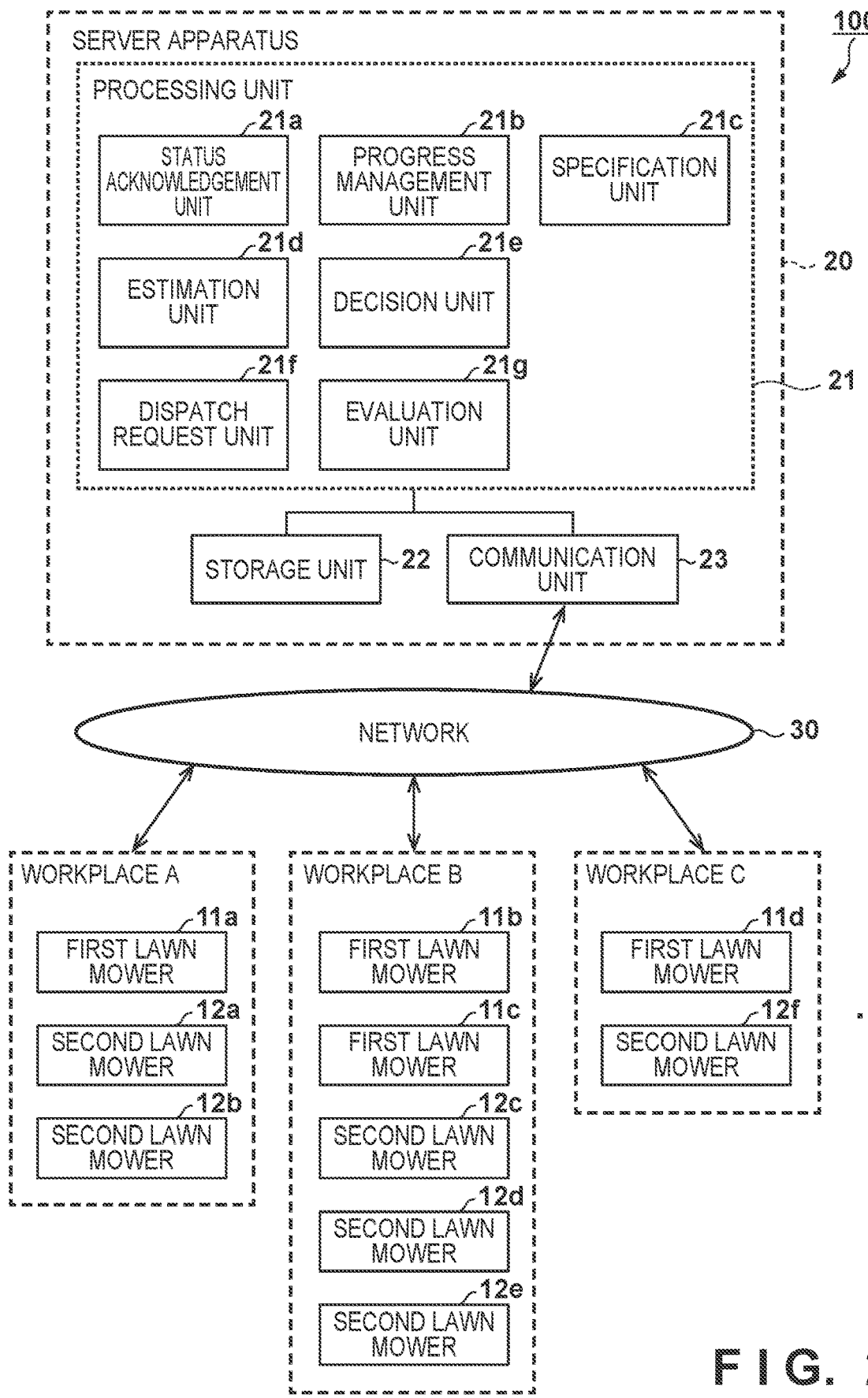
FIG. 2 is a block diagram showing a configuration of a system of a first embodiment.

FIG. 2 is a block diagram showing a configuration of a system 100 of the present embodiment. The system 100 of the present embodiment can include a plurality of work machines (first lawn mowers 11, second lawn mowers 12) that are in operation at each of the worksites A to C, a server apparatus 20 (cloud), and a network 30. In the case of the present embodiment, one first lawn mower 11a and two second lawn mowers 12a and 12b are placed at the worksite A, two first lawn mowers 11b and 11c and three second lawn mowers 12c, 12d and 12e are placed at the worksite B, and one first lawn mower 11d and one second lawn mower 12f are placed at the worksite C.

Each of the plurality of lawn mowers (first lawn mowers 11a to 11d, second lawn mowers 12a to 12f) is provided with a plurality of sensors, such as a GPS sensor that detects the position of the lawn mower, a gyroscope that detects a rotary motion of the lawn mower, and a rotation frequency sensor that detects the rotation frequency of a lawn mowing blade. Then, each lawn mower transmits pieces of information obtained by respective sensors, in association with one another, to the server apparatus 20 via the network 30. In the present embodiment, for example, information which has been obtained based on the results of detection by respective sensors and which includes the position of the lawn mower when lawn mowing work is started by increasing the rotation frequency of the lawn mowing blade, as well as the position of the lawn mower when lawn mowing work is stopped by reducing the rotation frequency of the lawn mowing blade, can be transmitted to the server apparatus 20 via the network 30. Furthermore, information which has been obtained based on the results of detection by respective sensors and which indicates the route of movement of the lawn mower that moved while performing lawn mowing work, may be transmitted to the server apparatus 20 via the network 30. Note that hereinafter, information that is transmitted from each lawn mower to the server apparatus via the network may be referred to as "work information".

The server apparatus 20 can include, for example, a processing unit 21, a storage unit 22, and a communication unit 23. The processing unit 21 includes a processor, which is typically a CPU, a storage device such as a semiconductor memory, an interface with an external device, and the like. The storage unit 22 stores, for example, a program executed by the processor and data used by the processor in processing, and the processing unit 21 is capable of reading out the program stored in the storage unit 22 to a storage device such as a memory, and executing the program.

The processing unit 21 can include, for example, a status acknowledgement unit 21a, a progress management unit 21b, a specification unit 21c, an estimation unit 21d, a decision unit 21e, a dispatch request unit 21f, and an evaluation unit 21g.

The status acknowledgement unit 21a acknowledges the work status of each worksite per work type based on work information obtained from each of the plurality of lawn mowers that are performing lawn mowing work at each workplace. The progress management unit 21b compares the work status acknowledged by the status acknowledgement unit 21a with a work plan, and manages the progress status of each worksite per work type. The specification unit 21c specifies, per worksite, a work type for which the work status has been delayed relative to the work plan based on the progress status managed by the progress management unit.

The estimation unit 21d estimates a non-worked area of a worksite where the work plan has been delayed. The decision unit 21e decides on the number of work machines and the number of workers that are necessary for lawn mowing work in the non-worked area based on work performances in a worked area of the worksite with this delay. That is to say, the decision unit 21e decides on the type and the number of work machines and the number of workers that are necessary for making up for the delay in the work plan. The dispatch request unit 21f makes a dispatch request to another worksite (e.g., a worksite where the work plan has been advanced) based on the type and the number of work machines and the number of workers that have been decided on by the decision unit. It is sufficient to make this dispatch request to, for example, an information terminal provided at each worksite. Furthermore, the evaluation unit 21g evaluates workers who operate lawn mowers. The evaluation unit 21g will be described in a second embodiment.

Furthermore, the communication unit 23 is connected in a communication-enabled manner to each of the plurality of lawn mowers (first lawn mowers 11a to 11d, second lawn mowers 12a to 12f), and to the information terminal provided at each worksite, via the network 30. Specifically, the communication unit 23 has a function as a reception unit that receives information from each lawn mower and the information terminal of each worksite via the network 30, and a function as a transmission unit that transmits information to each lawn mower and the information terminal of each worksite via the network 30.

[Processing Between Plurality of Workplaces and Server Apparatus]

Figure 3:
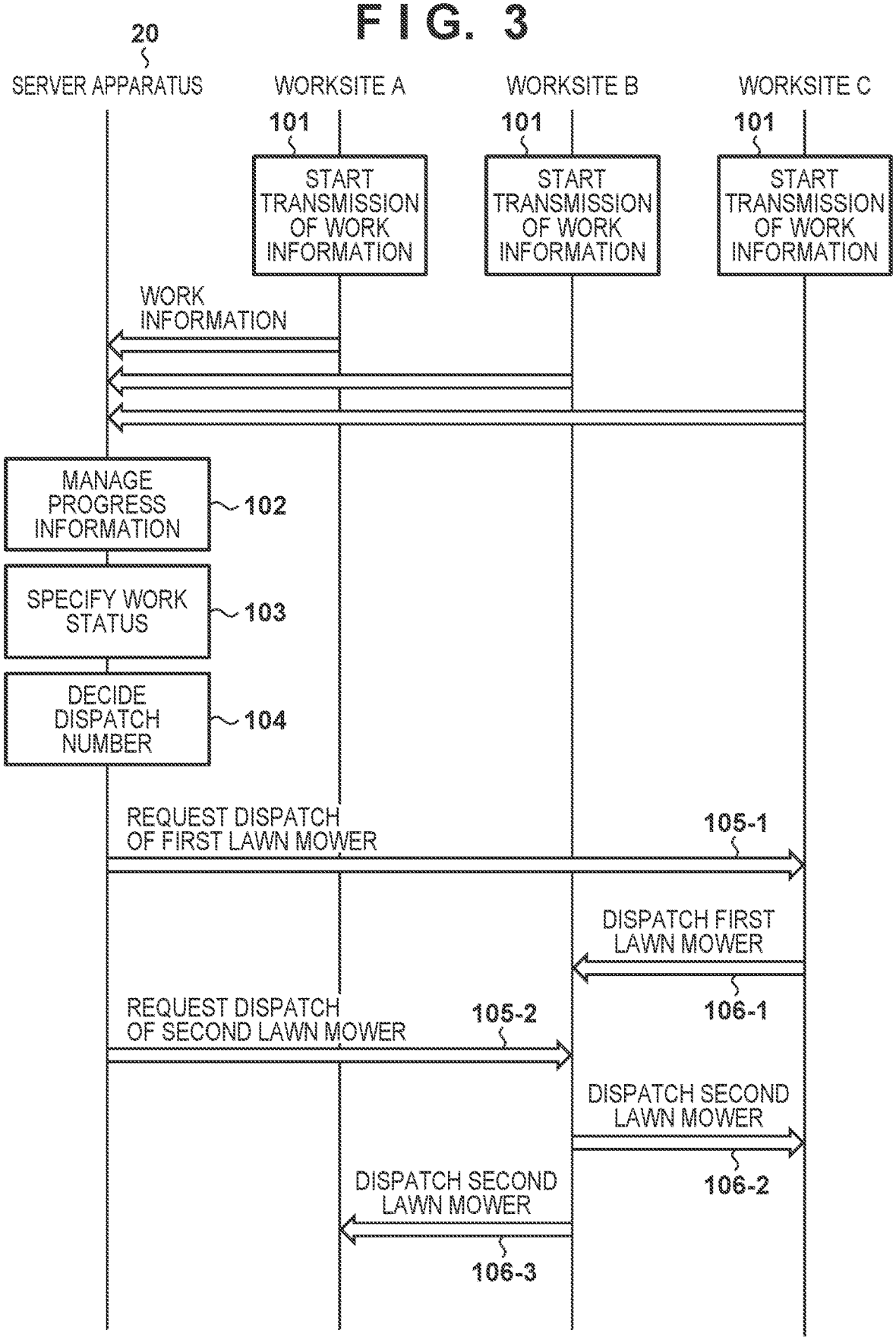
FIG. 3 is one example of a sequence diagram showing processing performed between a plurality of workplaces and a server apparatus.

FIG. 3 is one example of a sequence diagram showing processing that is performed between the plurality of workplaces A to C (each lawn mower and information terminal) and the server apparatus 20. It is assumed that, in the example shown in FIG. 3, the work plan has been delayed in terms of lawn mowing work in the central region CR of the worksite B (work that uses the first lawn mowers 11), and lawn mowing work in the peripheral regions PR of the worksites A, C (work that uses the second lawn mowers 12). It is also assumed that the work plan has been delayed in terms of lawn mowing work in the central region CR of the worksite C, and lawn mowing work in the peripheral region PR of the worksite B.

Once lawn mowing work has been started at each of the worksites A to C, each of the plurality of lawn mowers (first lawn mowers 11, second lawn mowers 12) start transmitting work information to the server apparatus 20 (step 101). Although the transmission of work information is started at the same timing at the plurality of worksites A to C in the example shown in FIG. 3, the transmission of work information may be started at different timings in accordance with the start of work at each worksite.

Based on the work information obtained from each lawn mower at each of the worksites A to C, the server apparatus 20 acknowledges the work status of each worksite per work type, and manages, per work type, the progress status of each worksite obtained by comparing the work status with the work plan (step 102). Then, based on the obtained progress status, the server apparatus 20 specifies, per worksite, a work type for which the work status has been delayed or advanced relative to the work plan (step 103). In the case of the present embodiment, as stated earlier, regarding lawn mowing work in the central region CR (work that uses the first lawn mowers 11), the server 20 specifies that there has been a delay at the worksite B, and there has been an advancement at the worksite C. Furthermore, regarding lawn mowing work in the peripheral region PR (work that uses the second lawn mowers 12), the server 20 specifies that there has been a delay at the worksites A, C and there has been an advancement at the worksite B.

Regarding the work type of the worksite for which the work status has been delayed, the server apparatus 20 decides on the type and the number of lawn mowers and the number of workers that are necessary for making up for the delay in the work status (step 104). Then, a request for dispatch of lawn mowers and workers to the worksite where the work status has been delayed is made to the worksite where the work status has been advanced (step 105). The worksite that has received the dispatch request dispatches the lawn mowers and workers targeted by the dispatch request to the worksite where the work status has been delayed (step 106).

For example, regarding lawn mowing work in the central region CR, assume that the server apparatus 20 has decided that the delay in the work status can be made up for by dispatching one first lawn mower 11 to the worksite B. In this case, the server apparatus 20 makes a dispatch request to the worksite C where the work status has been advanced so that one first lawn mower 11 and a worker (operator) therefor will be dispatched to the worksite B after the lawn mowing work in the central region CR is completed (step 105-1). Then, the worksite C that has received the dispatch request dispatches one first lawn mower 11 and a worker therefor to the worksite B (step 106-1).

On the other hand, regarding lawn mowing work in the peripheral region PR, assume that the server apparatus 20 has decided that the delay in the work status can be made up for by dispatching one second lawn mower each to the worksites A, C. Also assume that the work status has been more delayed in the worksite C than in the worksite A. In this case, the server apparatus 20 makes a dispatch request to the worksite B so that one second lawn mower 12 will be immediately dispatched to the worksite C (step 105-2). Then, the worksite B that has received the dispatch request immediately dispatches one second lawn mower 12 to the worksite C (step 106-2). Furthermore, the server apparatus 20 performs lawn mowing work in the peripheral region PR of the worksite B with use of the remaining two second lawn mowers 12, and makes a dispatch request to the worksite B so that one second lawn mower 12 will be dispatched to the worksite A upon completion of lawn mowing work in a predetermined range (e.g., 90%) of the peripheral region of the worksite B (step 105-2). Then, the worksite B that has received the dispatch request dispatches one second lawn mower 12 to the worksite A upon completion of lawn mowing work in the predetermined range of the peripheral region (step 106-3).

The aforementioned requests for dispatch of lawn mowers can be made based on a calculation result indicating how many work machines should be deployed at what timing in order to complete lawn mowing work, within a predetermined period, in a non-worked area (an area in which lawn mowing work is necessary) at the worksite where the work status has been delayed. This calculation can be performed based on, for example, work performances (e.g., the work speed) in a worked area at the worksite where the work status has been delayed, work performances in a worked area at the worksite where the work status has been advanced, and the like. Here, the plurality of lawn mowers may vary in the work speed depending on machine performances and the techniques of workers. In view of this, the server apparatus 20 may make a dispatch request by designating a specific lawn mower (worker) based on work performances of each lawn mower (worker).

[Processing Flow of Server Apparatus]

Figure 4:
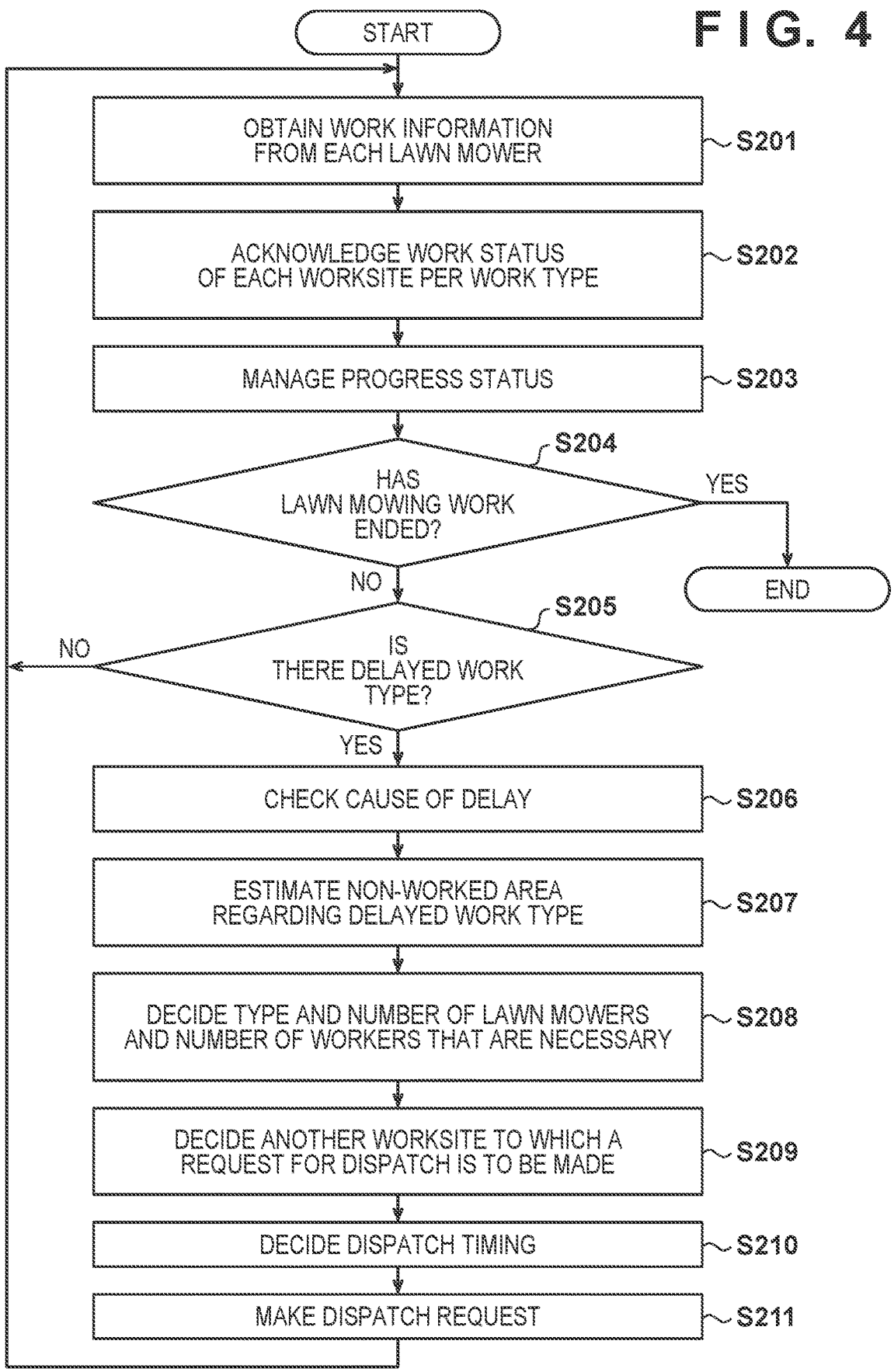
FIG. 4 is one example of a flowchart showing a processing flow of the server apparatus.

Next, processing executed by the server apparatus 20 (step 102 to step 105 of FIG. 3) will be specifically described. FIG. 4 is one example of a flowchart showing a processing flow of the server apparatus 20. Each step of the flowchart shown in FIG. 4 can be performed by the processing unit 21 of the server apparatus 20.

In S201, the processing unit 21 obtains work information from each of the plurality of lawn mowers (first lawn mowers 11, second lawn mowers 12) that are performing lawn mowing work in each worksite via the communication unit 23. In S202, based on the work information obtained from each lawn mower in S201, the processing unit 21 (status acknowledgement unit 21a) acknowledges (decides on, calculates) the work status of each worksite per work type. For example, based on the results of detection by the sensors (GPS sensor, rotation frequency sensor, etc.) provided in each first lawn mower 11, the processing unit 21 obtains the routes of movements of the first lawn mowers 11 during lawn mowing work with an increased rotation frequency of the lawn mowing blade. As a result, the processing unit 21 regards these routes of movements as worked areas (i.e., areas in which lawn mowing work has been completed), and can acknowledge the work status in the central region CR of each worksite. Similarly, based on the results of detection by the sensors (GPS sensor, rotation frequency sensor, etc.) provided in each second lawn mower 12, the processing unit 21 obtains the routes of movements of the second lawn mowers during lawn mowing work with an increased rotation frequency of the lawn mowing blade. As a result, the processing unit 21 regards these routes of movements as worked areas, and can acknowledge the work status in the peripheral region PR of each worksite.

In S203, the processing unit 21 (progress management unit 21b) compares, per work type of each worksite, the work status acknowledged in S202 with a work plan that has been set in advance, and manages (decides on, calculates) the progress status, such as whether the work status has been delayed or advanced relative to the work plan. Then, in S204, the processing unit 21 determines whether lawn mowing work has been completed at each of the plurality of worksites based on the progress status managed in S203. When lawn mowing work has been completed at every worksite, the processing flow is ended; when there is a worksite in which lawn mowing work has not been completed, processing proceeds to S205. In S205, based on the progress status managed in S203, the processing unit 21

(specification unit 21c) determines, per worksite, whether there is a work type for which the work status has been delayed relative to the work plan (specifies a work type of a worksite for which the work status has been delayed). When there is a work type for which the work status has been delayed at any of the worksites, processing proceeds to S206; when there is no work type for which the work status has been delayed, S201 to S204 are repeated.

In S206, with respect to a worksite where the work status has been delayed, the processing unit 21 checks the cause of this delay. Examples of the cause of the delay in the work status include a vacancy in or late arrival of workers, a failure or trouble in equipment, weather (rain, snow), and so forth. The processing unit 21 makes an inquiry to the information terminal provided at the worksite about the cause of the delay in the work status via the network, and obtains the cause of the delay that has been registered with this information terminal by a worker (a person in charge) of the worksite.

In S207, with regard to the work type of the worksite for which the work status has been delayed, the processing unit 21 (estimation unit 21d) estimates a non-worked area (i.e., an area in which lawn mowing work has not been performed yet) based on the work status acknowledged in S202. Then, in S208, the processing unit 21 (decision unit 21e) decides on the type and the number of lawn mowers and the number of workers that are necessary for making up for the delay in the work status (i.e., that should be requested to be dispatched to another worksite) in connection with work in the non-worked area. For example, based on the work performances (e.g., the work speed of one lawn mower) in a worked area in the worksite where the work status has been delayed, the processing unit 21 decides on the type and the number of lawn mowers that are necessary for performing work in the non-worked area so as to catch up with the work plan. At this time, the processing unit 21 may decide on the type and the number of necessary lawn mowers based on the cause of the delay obtained in S206.

As a specific example, in a case where the work status has been delayed in the peripheral region PR of the worksite C shown in FIG. 1C, it is necessary for the worksite C to have more second lawn mowers 12 as the type of the lawn mowers. Then, provided that the surface area of a non-worked area in the peripheral region PR of the worksite C is S, the work speed (work performance) of one second lawn mower 12 is V, and a period until the scheduled work completion time according to the work plan is T, the number N of second lawn mowers 12 that are necessary for making up for the delay can be calculated by $N=T/(S/V)$.

In S209, the processing unit 21 decides on another worksite to which a request for dispatch of lawn mowers to the worksite where the work status has been delayed is to be made. For example, based on the work performances in a worked area at each worksite, the processing unit 21 decides on the number of work machines and the number of workers that can be dispatched from each worksite. Then, a worksite that has dispatchable work machines and workers can be decided on as another worksite to which the dispatch request is to be made. Furthermore, with regard to the work type of the worksite for which the work status has been delayed, the processing unit 21 may decide on another worksite where the work status has been advanced relative to the work plan as the target worksite to which the dispatch request is to be made.

In S210, the processing unit 21 decides on a timing of dispatch of lawn mowers from another worksite that was decided on in S208 as the target worksite to which the dispatch request is to be made. For example, if lawn mowers are immediately dispatched from the foregoing another worksite at a timing of reception of the dispatch request, the work status may be delayed at the foregoing another worksite. For this reason, based on the work performances (e.g., the work speed of one lawn mower) in a worked area at each worksite, the processing unit 21 decides on the number of work machines and the number of workers that can be dispatched from each worksite. Then, it is sufficient to decide on a timing of dispatch of lawn mowers so that the time of completion of lawn mowing work at the worksite that dispatches lawn mowers and the time of completion of lawn mowing work at the worksite to which lawn mowers are dispatched become close to each other. As a specific example, in a case where the work status has been delayed in the peripheral region PR of the worksite C shown in FIG. 1C while the work status has been advanced in the peripheral region PR of the worksite B, the processing unit 21 can decide on a timing of dispatch of second lawn mowers so that one second lawn mower is dispatched from the worksite B to the worksite C upon completion of lawn mowing work in a predetermined range (e.g., 90%) of the peripheral region of the worksite B.

In S211, the processing unit 21 (dispatch request unit 21f) makes a dispatch request that includes the type and the number of lawn mowers and the number of workers that were decided on in S208, as well as the dispatch timing that was decided on in S210, to another worksite that was decided on in S209. The dispatch request can be made to, for example, an information terminal provided at the foregoing another worksite. In this way, the foregoing another worksite can dispatch the type and the number of lawn mowers that are necessary for the work type of the worksite for which the work status has been delayed, and the overall work efficiency of the plurality of worksites can be improved.

As described above, when work is performed by a team with use of a plurality of types of lawn mowers (work machines) at each of the plurality of worksites, each work type is not always completed according to the work plan, and the work status may be delayed with regard to a specific work type. In the present embodiment, a specific work type for which the work status has been delayed is acknowledged, and lawn mowers and workers are allocated in accordance with the statuses of other worksites; as a result, the overall work efficiency of the plurality of worksites can be improved.

Second Embodiment

A description is now given of a second embodiment according to the present invention. The first embodiment has been described using an example in which the progress status of each worksite is managed based on work information obtained from each lawn mower. The second embodiment will be described using an example in which a worker who operates each lawn mower is evaluated based on work information obtained from each lawn mower.

Figure 5:
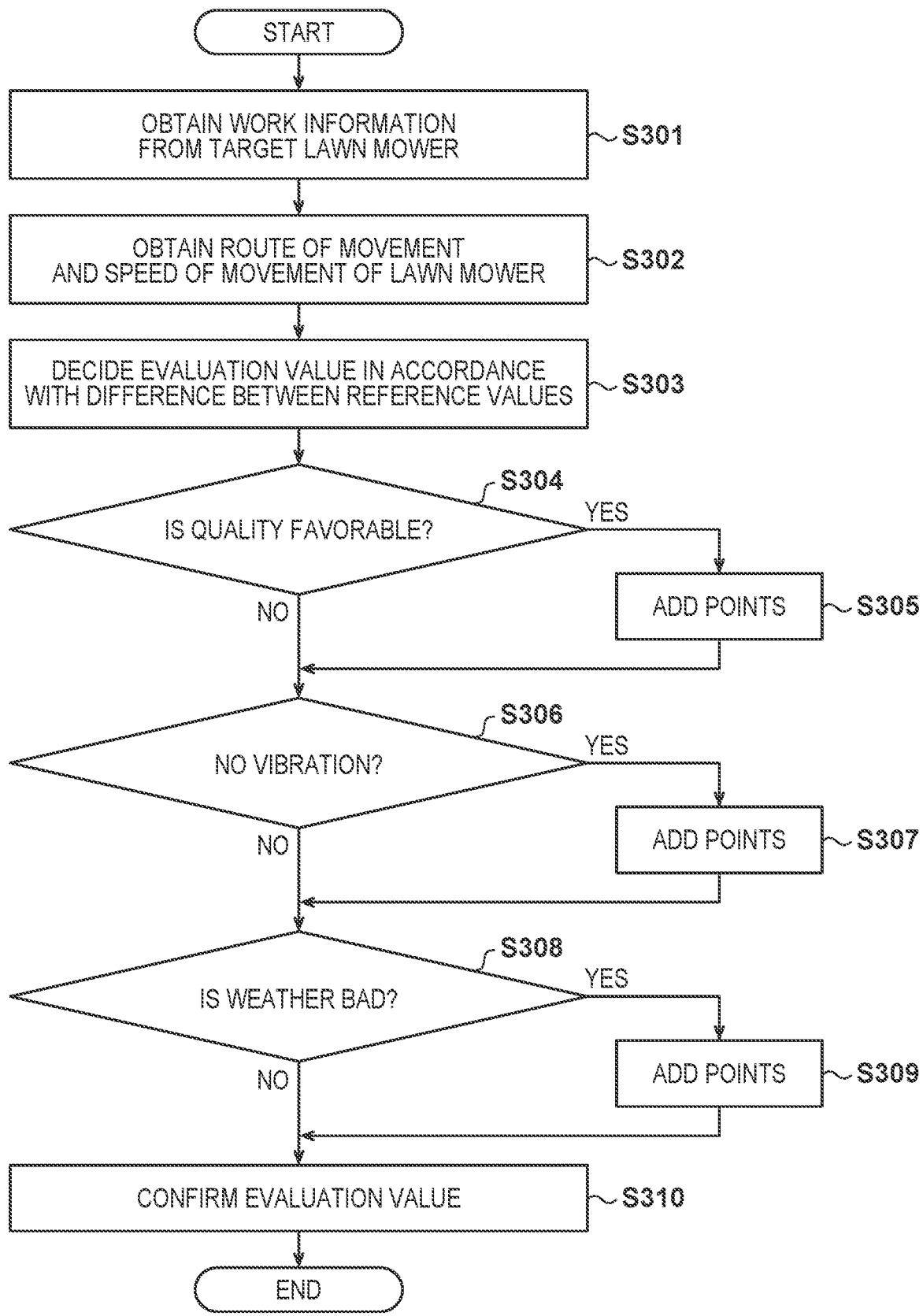
FIG. 5 is one example of a flowchart showing a processing flow for evaluating a worker who operates a lawn mower.

FIG. 5 is one example of a flowchart showing a processing flow for evaluating a worker who operates a lawn mower. Each step of the flowchart shown in FIG. 5 can be performed by the processing unit 21 (evaluation unit 21g) of the server apparatus 20. Furthermore, the flowchart shown in FIG. 5 is intended to evaluate a worker who operates one lawn mower that serves as an evaluation target (hereinafter may be referred to as a target lawn mower) among a plurality of lawn mowers; it may be performed in parallel with the flowchart shown in FIG. 4, or may be performed after the flowchart shown in FIG. 4.

In S301, the processing unit 21 obtains work information from a target lawn mower (first lawn mower 11 or second lawn mower 12) via the communication unit 23. The work information may be the work information that was obtained in S201 of the aforementioned flowchart of FIG. 4 and stored in the storage unit 22. In the case of the present embodiment, a lawn mower is provided with a plurality of sensors, such as a GPS sensor that detects the position of the lawn mower, a gyroscope that detects a rotary motion of the lawn mower, a rotation frequency sensor that detects the rotation frequency of a lawn mowing blade, and a vibration sensor (G sensor, acceleration sensor) that detects external vibration applied to the lawn mower. The processing unit 21 obtains information obtained by these sensors as work information via the communication unit 23.

In S302, based on the work information obtained in S301 (e.g., the results of detection by the GPS sensor and the rotation frequency sensor), the processing unit 21 obtains the route of movement and the speed of movement of the lawn mower during lawn mowing work. Then, in S303, the processing unit 21 uses the difference between the route of movement obtained in S302 and a reference value (reference route) as an evaluation index, and decides on an evaluation value in accordance with this difference. Similarly, the processing unit 21 uses the difference between the speed of movement obtained in S302 and a reference value (reference speed) as an evaluation index, and decides on an evaluation value in accordance with this difference. In the case of the present embodiment, the evaluation values can be decided on based on, for example, a table that shows the relationships of the evaluation values to the differences between the detected values and the reference values as exemplarily shown in FIG. 6; however, as a method of deciding on the evaluation values, another method, such as a method that uses a formula for example, may be adopted. Furthermore, while the reference values (reference route, reference speed) according to the present embodiment are generated based on work information obtained through lawn mowing work that has been actually performed by a model worker (skilled worker), they may be generated based on work information obtained through previous lawn mowing work performed by the same worker.

In S304, the processing unit 21 determines whether the quality of lawn mowing work is favorable. For example, when the rotation frequency of the lawn mowing blade is not in conformity with the speed of movement of the lawn mower, the lawn could be possibility left unmown, for example. The processing unit 21 can evaluate the quality of lawn mowing work (e.g., unmown lawn) based on images obtained by a fixed-point camera provided at a worksite, or by a camera mounted on the lawn mower itself. Furthermore, the processing unit 21 may evaluate the quality of lawn mowing work based on unmown lawn information that has been registered with (input to) the information terminal of the worksite by a person in charge of the worksite. When the quality of lawn mowing work is favorable, points are added to the evaluation values in S305, and then processing proceeds to S306. On the other hand, when the quality of lawn mowing work is not favorable, processing proceeds to S306 without adding points.

Here, although points are added when the quality of lawn mowing work is favorable in the present embodiment, it is permissible to adopt, for example, a mode in which points are deducted when the quality of lawn mowing work is not favorable.

In S306, the processing unit judges whether external vibration has been applied to the lawn mower during lawn mowing work based on the work information obtained in S301 (e.g., the result of detection by the vibration sensor). For example, when the vibration sensor has detected vibration, there is a high possibility that the lawn mower has had a crash and the like. Therefore, when the vibration sensor has not detected vibration, the processing unit 21 adds points in S307, and then processing proceeds to S308. On the other hand, when the vibration sensor has detected vibration, processing proceeds to S308 without adding points. Here, although points are added when vibration has not been detected in the present embodiment, it is permissible to adopt, for example, a mode in which points are deducted when vibration has been detected.

In S308, the processing unit 21 obtains weather information of the worksite, and adds points to the evaluation values in accordance with this weather information. As the weather at the worksite may influence the progress of lawn mowing work, the processing unit 21 adds points to the evaluation values in accordance with the weather at the worksite. When the worksite is in bad weather (e.g., rain), points are added in S309, and then processing proceeds to S310. On the other hand, when the worksite is not in bad weather (e.g., sunny), processing proceeds to S310 without adding points. Here, although points are added when the worksite is in bad weather in the present embodiment, it is permissible to adopt, for example, a mode in which points are deducted when the worksite is not in bad weather. Furthermore, the weather information may be information that has been registered with the information terminal of the worksite by a worker (a person in charge) of the worksite, or may be information obtained from images that have been obtained by the camera of the worksite or the lawn mower.

In S310, the processing unit 21 confirms the evaluation values obtained through the aforementioned steps of S302 to S309. The confirmed evaluation values may be, for example, used in setting the incentive for the worker, such as a raise and a compensation, or used to select an educational program about lawn mowing work for the worker. By thus evaluating a worker who operates a lawn mower based on work information obtained from this lawn mower, the capability of the worker can be improved, and the work efficiency of a worksite can be further improved.

Summary of Embodiments

The above-described embodiments disclose at least the following management method or server apparatus.

1. A management method according to the above-described embodiments is a management method that manages a plurality of worksites, the management method including:
    acknowledging a work status of each worksite per work type based on information obtained from a plurality of types of work machines (e.g., 11, 12) at each worksite;
    comparing the work status with a plan, and managing a progress status of each worksite per work type;
    specifying, based on the progress status, a work type of a worksite for which the work status has been delayed relative to the plan; and
    making, with regard to a work machine and a worker for the work type with the delay, a request for dispatch to the worksite with the delay to another worksite.

According to this configuration, when work is performed by a team with use of a plurality of types of lawn mowers (work machines) at each of a plurality of worksites, a specific work type for which the work status has been delayed is acknowledged, and lawn mowers and workers are allocated in accordance with the statuses of other worksites; as a result, the overall work efficiency of the plurality of worksites can be improved.

2. The management method according to the above-described embodiments, further including:
estimating a non-worked area of the work type of the worksite with the delay based on the work status; and
deciding on the number of work machines and the number of workers that are necessary for work in the non-worked area based on work performances in a worked area of the work type of the worksite with the delay,
wherein in the making a request, a request for dispatch of the number of work machines and workers that has been decided on in the deciding is made to the another worksite.

According to this configuration, the number of work machines and workers that are necessary for processing in a non-worked area is decided on based on the work performances in the worksite with the delay; this makes it possible to make a dispatch request pursuant to an appropriate number in consideration of the actual conditions (difficulty in work attributed to the environment and the status) of the worksite with the delay.

3. The management method according to the above-described embodiments, further including:
registering a cause of the delay,
wherein in the deciding, the number of work machines and the number of workers that are necessary for work in the non-worked area are decided on further based on the cause.

According to this configuration, a dispatch request that is in conformity with the cause of the delay can be made appropriately.

4. The management method according to the above-described embodiments, further including:
deciding on a timing of dispatch of a work machine and a worker from the another worksite,
wherein in the making a request, a request for dispatch of a work machine and a worker at the timing that has been decided on in the deciding on a timing is made to the another worksite.

According to this configuration, work machines and workers can be dispatched at an appropriate timing so that there will be no delay in the work status at the workplace that received the dispatch request.

5. The management method according to the above-described embodiments, further including:
evaluating a worker who operates a work machine based on the information obtained from the plurality of types of work machines at each worksite.

According to this configuration, by evaluating a worker who operates a work machine based on work information obtained from this work machine, the capability of the worker can be improved, and the work efficiency of a worksite can be further improved.

6. A management method according to the above-described embodiments is a management method that manages a plurality of worksites, the management method including:
acknowledging a work status of each worksite per work type based on information obtained from a plurality of types of work machines (e.g., 11, 12) at each worksite;
comparing the work status with a plan, and managing a progress status of each worksite per work type;
specifying, based on the progress status, a work type for which the work status has been advanced relative to the plan; and
dispatching, to another worksite, a work machine and a worker for the work type with the advancement.

According to this configuration, when work is performed by a team with use of a plurality of types of lawn mowers (work machines) at each of a plurality of worksites, a specific work type for which the work status has been advanced is acknowledged, and lawn mowers and workers are allocated in accordance with the statuses of other worksites; as a result, the overall work efficiency of the plurality of worksites can be improved.

7. The management method according to the above-described embodiments, further including:
deciding on the number of dispatchable work machines and the number of dispatchable workers based on work performances in a worked area of the worksite with the advancement.

According to this configuration, dispatch to another worksite is carried out based on the work performances in the worksite with the advancement; this makes it possible to carry out appropriate dispatch in consideration of the characteristics (individual differences in the work speed) of the work machines and the workers to be dispatched.

8. The management method according to the above-described embodiments, further including:
registering a cause of a delay in the work status of the another worksite,
wherein in the deciding, the number of work machines and the number of workers to be dispatched to the another worksite are decided on further based on the cause.

According to this configuration, a dispatch request that is in conformity with the cause of the delay can be made appropriately.

9. A management method according to the above-described embodiments is a management method that manages a plurality of worksites, the management method including:
acknowledging a work status of each worksite per work type based on information obtained from a plurality of types of work machines (e.g., 11, 12) at each worksite;
comparing the work status with a plan, and managing a progress status of each worksite per work type;
specifying, based on the progress status, a work type for which the work status has been delayed relative to the plan, and a work type for which the work status has been advanced relative to the plan; and
making, with regard to a work machine and a worker for the work type with the delay, a request for dispatch to a worksite with the delay to a worksite with the advancement.

According to this configuration, when work is performed by a team with use of a plurality of types of lawn mowers (work machines) at each of a plurality of worksites, a specific work type for which the work status has been delayed and a specific work type for which the work status has been advanced are acknowledged, and lawn mowers and workers are allocated; as a result, the overall work efficiency of the plurality of worksites can be improved.

10. A server apparatus according to the above-described embodiments is a server apparatus (e.g., 20) that manages a plurality of worksites, the server apparatus including:

a status acknowledgement unit (e.g., 21a) configured to acknowledge a work status of each worksite per work type based on information obtained from a plurality of types of work machines (e.g., 11, 12) at each worksite;

a progress management unit (e.g., 21b) configured to compare the work status with a plan, and manage a progress status of each worksite per work type;

a specification unit (e.g., 21c) configured to specify, based on the progress status, a work type of a worksite for which the work status has been delayed relative to the plan; and a dispatch request unit (e.g., 21f) configured to make, with regard to a work machine and a worker for the work type with the delay, a request for dispatch to the worksite with the delay to another worksite.

According to this configuration, when work is performed by a team with use of a plurality of types of lawn mowers (work machines) at each of a plurality of worksites, a specific work type for which the work status has been delayed is acknowledged, and lawn mowers and workers are allocated in accordance with the statuses of other worksites; as a result, the overall work efficiency of the plurality of worksites can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method, comprising:
   providing a pool of a plurality of types of work machines, where a subset of the work machines are located at individual ones of the plurality of worksites, and individual ones of the work machines include one of a plurality of sensors that indicate a position of the individual ones of the work machines;
   obtaining, in a server apparatus, a plurality of pieces of work information that include a position of individual ones of the work machines from corresponding ones of the sensors while the work machines are moving and performing work within respective ones of the worksites, thereby obtaining a plurality of routes of movement of the work machines, the routes of movement being regarded as worked areas in respective ones of the worksites;
   calculating, in the server apparatus, a work status of each worksite per work type based on the routes of movement obtained from a plurality of types of work machines at each worksite;
   comparing, in the server apparatus, the calculated work status with a plan, and calculating a progress status of each worksite per work type;
   detecting, in the server apparatus, a delay in the work status relative to the plan for respective ones of the worksites;
   specifying, in the server apparatus, based on the calculated progress status, a work type of a delayed worksite for which the work status has been delayed relative to the plan among the plurality of worksites;
   determining, in the server apparatus, the number of work machines and the number of workers that are necessary for making up for a delay in the specified work type of the delayed worksites, based on the calculated progress status; and
   requesting, in the server apparatus, to another worksite different from the delayed worksite among the plurality of worksites, dispatch of the determined number of work machines and the determined number of workers to the delayed worksite,
   wherein the determining further determines a timing of the dispatch such that a completion time of work at the delayed worksite and a completion time of work at the other worksite are close to each other, and the requesting requests the dispatch having the determined timing.

2. The management method according to claim 1, further comprising:
   estimating a non-worked area of the specified work type of the delayed worksite based on the calculated work status; and
   wherein the determining determines the number of work machines and the number of workers that are necessary for work in the non-worked area so as to make up for the delay, based on work performances in a worked area of the specified work type of the delayed worksite.

3. The management method according to claim 2, further comprising:
   registering a cause of the delay,
   wherein the determining determines the number of work machines and the number of workers that are necessary for work in the non-worked area, further based on the registered cause.

4. The management method according to claim 1, further comprising:
   evaluating a worker who operates a work machine based on the work information obtained from the plurality of types of work machines at each worksite.

5. The management method according to claim 1, wherein the work machine is a lawn mower having a lawn mowing blade, and
   the work information includes information indicating a moving route of the lawn mower during lawn mowing work with an increased rotation frequency of the lawn mowing blade.

6. A method, comprising:
   providing a pool of a plurality of types of work machines, where a subset of the work machines are located at individual ones of a plurality of worksites, and individual ones of the work machines include one of a plurality of sensors that indicate a position of the individual ones of the work machines;
   obtaining, in a server apparatus, a plurality of pieces of work information that include a position of individual ones of the work machines from corresponding ones of the sensors while the work machines are moving and performing work within respective ones of the worksites, thereby obtaining a plurality of routes of movement of the work machines, the routes of movement being regarded as worked areas in respective ones of the worksites;
   calculating, in the server apparatus, a work status of each worksite per work type based on the routes of movement obtained from a plurality of types of work machines at each worksite;
   comparing, in the server apparatus, the calculated work status with a plan, and calculating a progress status of each worksite per work type;
   detecting, in the server apparatus, a delay in the work status relative to the plan for respective ones of the worksites;
   specifying, in the server apparatus, based on the calculated progress status, a work type of an advanced worksite for which the work status has been advanced relative to the plan among the plurality of worksites;

determining, in the server apparatus, the number of dispatchable work machines and the number of dispatchable workers in the specified work type of the advanced worksites, based on the calculated progress status; and dispatching, in a server apparatus, to another worksite different from the advanced worksite among the plurality of worksites, the determined number of work machines and the determined number of workers in the specified work type of the advanced worksite, wherein the determining further determines a timing of the dispatch such that a completion time of work at the advanced worksite and a completion time of work at the other worksite are close to each other, and the dispatching dispatches the determined number of work machines and the determined number of workers at the determined timing.

7. The management method according to claim 6, further comprising:

registering a cause of a delay in the work status of the other worksite, wherein the determining determines the number of work machines and the number of workers to be dispatched to the other worksite, further based on the cause.

8. A method, comprising:

providing a pool of a plurality of types of work machines, where a subset of the work machines are located at individual ones of a plurality of worksites, and individual ones of the work machines including one of a plurality of sensors that indicate a position of the individual ones of the work machines;

obtaining, in a server apparatus, a plurality of pieces of work information that include a position of individual ones of the work machines from corresponding ones of the sensors while the work machines are moving and performing work within respective ones of the worksites, thereby obtaining a plurality of routes of movement of the work machines, the routes of movement being regarded as worked areas in respective ones of the worksites;

calculating, in the server apparatus, a work status of each worksite per work type based on the routes of movement obtained from a plurality of types of work machines at each worksite;

comparing, in the server apparatus, the calculated work status with a plan, and calculating a progress status of each worksite per work type;

detecting, in the server apparatus, a delay in the work status relative to the plan for respective ones of the worksites;

specifying, in the server apparatus, based on the calculated progress status, a work type of a delay worksite for which the work status has been delayed relative to the plan, and a work type of an advanced worksite for which the work status has been advanced relative to the plan;

determining, in the server apparatus, the number of work machines and the number of workers that are necessary for making up for a delay in the specified work type of the delayed worksites, based on the calculated progress status; and generating a request, in the server apparatus, to the advanced worksite, a dispatch of the determined number of work machines and the determined number of workers to the delayed worksite, wherein the determining further determines a timing of the dispatch such that a completion time of work at the delayed worksite and a completion time of work at the advanced worksite are close to each other, and the requesting requests the dispatch having the determined timing.

9. A server apparatus, comprising:

at least one processor circuit with a memory comprising instructions, that when executed by the processor circuit, causes the at least one processor circuit to at least:

calculate a work status of each one of a plurality of worksites per work type based on work information obtained from a plurality of types of work machines at each worksite, and individual ones of the work machines include one of a plurality of sensors that indicate a position of the individual ones of the work machines;

obtain a plurality of pieces of work information that include a position of individual ones of the work machines from corresponding ones of the sensors while the work machines are moving and performing work within respective ones of the worksites, thereby obtaining a plurality of routes of movement of the work machines, the routes of movement being regarded as worked areas in respective ones of the worksites;

compare the calculated work status with a plan, and calculating a progress status of each worksite per work type;

detect a delay in the work status relative to the plan for respective ones of the worksites;

specify, based on the calculated progress status, a work type of a delayed worksite for which the work status has been delayed relative to the plan among the plurality of worksites;

determine the number of work machines and the number of workers that are necessary for making up for a delay in the specified work type of the delayed worksites, based on the calculated progress status; and requesting, to another worksite different from the delayed worksite among the plurality of worksites, dispatch of the determined number of work machines and the determined number of workers to the delayed worksite, wherein the determining further determines a timing of the dispatch such that a completion time of work at the delayed worksite and a completion time of work at the other worksite are close to each other, and the dispatch request unit is configured to request the dispatch having the determined timing.

* * * * *